United States Patent

Murray et al.

[11] Patent Number: 5,587,615
[45] Date of Patent: Dec. 24, 1996

[54] ELECTROMAGNETIC FORCE GENERATOR

[75] Inventors: Bruce S. Murray, Winchester; Howard C. Noble, Cohasset; Wilma W. Quinn, Wakefield, all of Mass.

[73] Assignee: Bolt Beranek and Newman Inc., Cambridge, Mass.

[21] Appl. No.: 362,133

[22] Filed: Dec. 22, 1994

[51] Int. Cl.⁶ .................................................. H02K 33/12
[52] U.S. Cl. .................................................. 310/30; 310/15
[58] Field of Search .................................. 310/15, 17, 27, 310/28, 29, 30, 21

[56]          References Cited

U.S. PATENT DOCUMENTS

| | | | |
|---|---|---|---|
| 3,022,450 | 2/1962 | Chase, Jr. | 361/194 |
| 3,105,153 | 9/1963 | James, Jr. | 290/1 |
| 3,119,940 | 1/1964 | Pettit et al. | 310/24 |
| 3,419,739 | 12/1968 | Clements | 310/15 |
| 3,484,629 | 12/1969 | Kunz | 310/15 |
| 3,518,463 | 6/1970 | Abbott | 310/15 |
| 3,643,117 | 2/1972 | Alger et al. | 310/17 |
| 3,670,223 | 6/1972 | Pommeret | 310/30 X |
| 3,754,154 | 8/1973 | Massie | 310/30 |
| 3,755,699 | 8/1973 | Cartwright | 310/12 |
| 3,891,874 | 6/1975 | Roters et al. | 310/14 |
| 3,894,817 | 7/1975 | Majoros et al. | 310/30 X |
| 3,980,708 | 9/1976 | Pittet et al. | 568/447 |
| 4,533,890 | 8/1985 | Patel | 310/30 X |
| 4,631,430 | 12/1986 | Aubrecht | 310/12 |
| 4,697,113 | 9/1987 | Young | 310/15 |
| 4,749,891 | 6/1988 | Sheng | 310/15 |

Primary Examiner—Steven L. Stephan
Assistant Examiner—Judson H. Jones
Attorney, Agent, or Firm—Henry D. Pahl, Jr.

[57]          ABSTRACT

The electromagnetic force generator disclosed herein employs first and second elongate magnetic cores having transversely facing pole faces at each end, the cores being essentially parallel with pole faces aligned and facing. Between each pair of aligned pole faces is a relatively moveable core. A suspension provides a compliant mechanical connection between the moveable and elongate cores. The moveable cores are polarized by a permanent magnet mounted between the elongate cores and polarized along an axis paralleling the length of the elongate cores. Respective windings are provided around the elongate cores. A.c. energization of the windings creates a corresponding vibratory force between the movable cores and the elongate cores.

9 Claims, 3 Drawing Sheets

5,587,615

ELECTROMAGNETIC FORCE GENERATOR

BACKGROUND OF THE INVENTION

The present invention relates to an electromagnetic force generator and more particularly to such a generator or actuator which allows the connection of only a relatively small mass to the structure to be driven. Such force generators are commonly referred to as shakers.

For various types of testing it is desired to apply a vibratory force to a structure under test. Ideally the transducer applying the force should have wide bandwidth, linear response, and should couple relatively little additional mass to the structure which is to be driven. While some prior designs have achieved reasonable linearity and broad bandwidths, they have typically exhibited a relatively large inertial mass at the output point, i.e., the flange by means of which the transducer is coupled to the structure under test.

Among the several objects of the present invention may be noted the provision of a novel electromagnetic force generator; the provision of such a generator which couples a relatively small mass to the structure to which force is to be applied; the provision of such a generator which is highly linear and which exhibits wide bandwidth; the provision of such a generator which is efficient and which is of relatively simple and inexpensive construction. Other objects and features will be in part apparent and in part pointed out hereinafter.

SUMMARY OF THE INVENTION

An electromagnetic force generator in accordance with the present invention employs a first elongate magnetic core having transversely facing pole faces at each end. A second elongate magnetic core is provided essentially parallel to the first core, spaced therefrom, and having transversely facing pole faces at each end aligned with corresponding pole faces of the first core. Between each pair of aligned pole faces is a relatively moveable core. A magnet mounted between the first and second cores and polarized along an axis essentially paralleling the first and second cores extends to gaps adjacent the moveable cores. Means are provided for attaching the moveable cores to a structure to which forces are to be applied. By applying alternating current to the respective windings around the first and second cores, a vibratory force is generated between the moveable cores and the first and second cores.

BRIEF DESCRIPTION OF THE DRAWINGS

Corresponding reference characters indicate corresponding parts throughout the several views of the drawings.

DESCRIPTION OF THE PREFERRED EMBODIMENTS

In common with many prior art systems, the force generator of the present invention employs a output element which is driven with respect to an inertial mass. As indicated previously, it is an advantage of the force generator of the present invention that the mass associated with the output element is relatively small as compared with the inertial mass.

Figure 1:
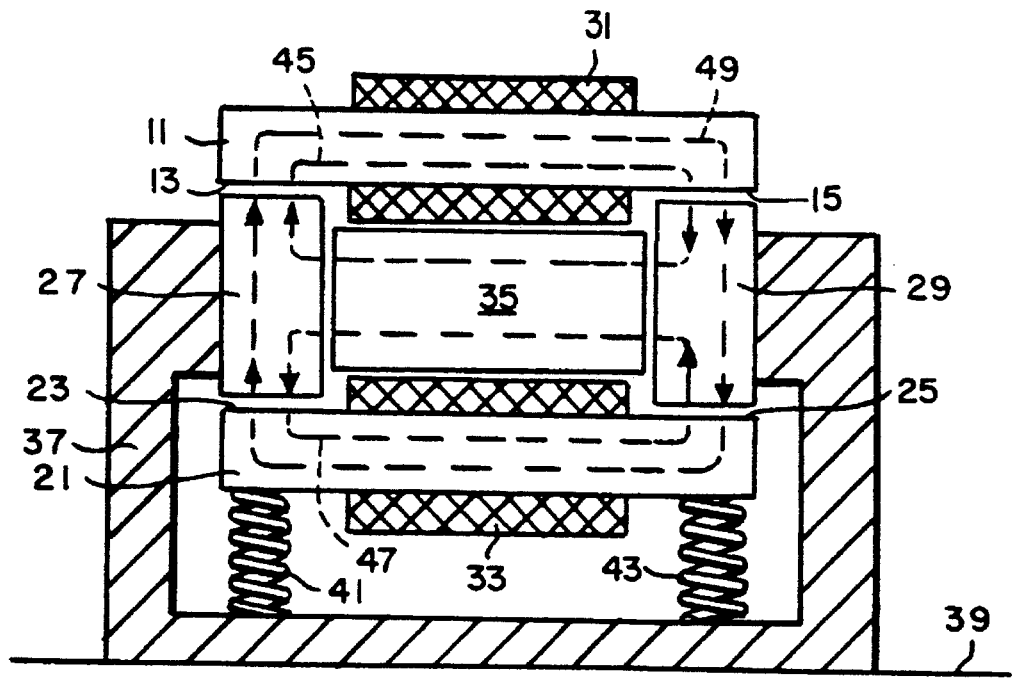
FIG. 1 is a diagram illustrating the magnetic components of an electromagnetic force generator in accordance with the present invention.

Referring now to FIG. 1, a first elongate magnetic core is designated by reference character 11. Core 11 may be made up on soft iron laminations and provides, at each end, transversely facing pole faces 13 and 15. In the orientation illustrated, the pole faces are directed downwardly. While the pole faces are shown as being coplanar with the length of the core 11, it should be understood that they might project downwardly.

Extending parallel to the first magnetic core and spaced therefrom is a second elongate magnetic core 21 having, at each end transversely facing pole faces 23 and 25. Pole faces 23 and 25 are upwardly facing and are aligned with and facing the corresponding pole faces of the first core 11. It should be understood that the term "elongate" is used in the present disclosure basically to establish an orientation useful in describing the relative locations of subsequently described components and thus no inference should be drawn as to relative length, width and depth. A winding 31 is provided for energizing the core 11 and a similar winding 33 is provided for energizing the core 21.

Between each pair of aligned pole faces is a relatively moveable core, i.e., moveable core 27 between faces 13 and 23 and moveable core 29 between faces 15 and 25. The direction of relative movement is vertical in the orientation shown in FIG. 1 and thus there is a gap of variable width between each of the pole faces on the elongate cores and the respective moveable core.

The relatively moveable cores 27 and 29 are mounted on a light weight, e.g., aluminum, frame 37 by means of which they can be attached to a structure, designated by reference character 39, to which a vibrating force is to be applied. A compliant mechanical connection is provided between the relatively moveable cores and the first and second cores by means of a suspension which is illustrated in the FIG. 1 simply by springs 41 and 43.

Mounted between the first and second cores 11 and 21 is a magnet 35 which, as described hereinafter, provides a steady state or d.c. bias to the moveable cores 27 and 29. Magnet 35 is preferably a permanent magnet and is preferably constructed of a so called rare earth magnetic material which provides a relatively high reluctance in relation to its coercive force and which is relatively resistant to demagnetization. Examples of such rare earth magnetic materials are neodymium iron boron and samarium cobalt.

The magnet 35 extends to a point closely adjacent each of the moveable cores 27 and 29 there thus being a sliding gap between the permanent magnet and each moveable core. According the widths of the sliding gaps will remain of essentially constant width as the cores 27 and 29 move in the vertical direction as illustrated.

The permanent magnet 35 provides an essentially constant or d.c. bias flux linking each of the moveable cores 27 and 29 with the elongate cores 11 and 21. This flux is indicated by the dotted arrows 45 and 47 in FIG. 1.

The winding 31 and 33 are employed to generate a variable or a.c. flux which links the elongate cores 11 and 13 and the relatively moveable cores 27 and 29 but which does not pass through the permanent magnet 35. This flux path is indicated by the dotted arrow 49 in FIG. 1.

Figure 2:
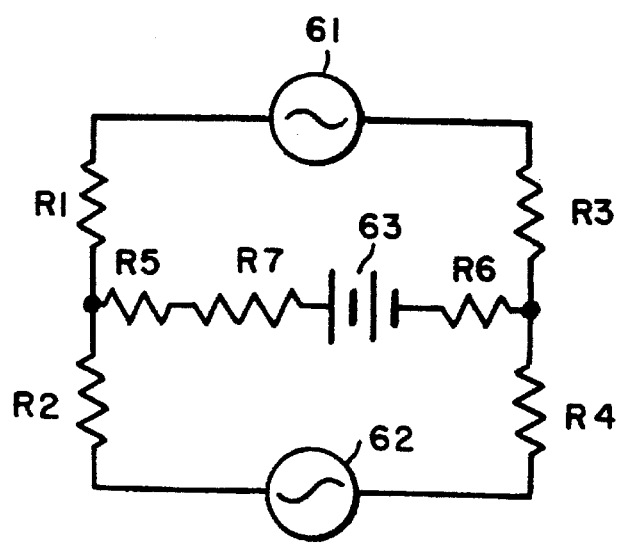
FIG. 2 is a schematic diagram illustrating an electrical analog of the magnetic circuits present in the force generator of FIG. 1.

Referring to FIG. 2, the basic magnetic circuit is shown as an ohmic and voltage arrangement to illustrate the distribution of reluctances and magnetic potentials. The excitations by the windings 31 and 33 are shown as a.c. voltage sources, 61 and 62 respectively, provided, and the magnet 35 is shown as a d.c. source or battery 63. The reluctances of the gaps are shown as resistance elements, the variable gaps between the moveable cores and the elongate cores being shown as variable resistances R1–R4 and the sliding gaps as resistances R5–R6. The reluctances of the rare earth magnet is represented by resistance R7. The reluctances of the laminated cores themselves are not shown since they have much lower reluctances than either the air gaps or the magnet. The variable gaps between the relatively moveable cores 27, 29 and the elongate cores 11, 21 are shown in FIG. 2 as resistances R1–R4. The reluctance of the magnet 35 is represented by resistance R7 while the reluctances of the sliding air gaps at the ends of the magnet are represented by resistances R5 and R6.

The excitation windings operate in phase so that the resulting flux passes through the gaps R1–R4, which form an outer flux path. No a.c. or excitation flux passes through the central path which comprises the sliding gaps R5 and R6 and the magnet R7. As the reaction mass moves the corresponding gap sizes vary and do their reluctances. At all times the upper gaps R1 and R3 have nominally matching reluctances, as do gaps R2 and R4 and thus there is no potential difference across the central magnet path and hence no a.c. excitation flux through the magnet. In practice slight mismatch between the variable gaps can occur and will lead to a potential difference but even in this case the passage of excitation flux through the permanent magnet is low due to the high reluctance R7 of the central magnet path.

The bias flux generated by the magnet enters the outer flux path and flows in opposite directions through the upper and lower gap pairs thus adding or subtracting to the excitation flux. The reluctance of the magnet path R5, R6 and R7 is made as high as practical which helps to reduce the undesirable negative stiffness of the magnetic circuit.

As indicated previously, the flux paths are indicated in FIG. 1 by the arrows 45, 47 and 49. With reference to FIGS. 1 and 2, the force calculation can be derived as follows. The excitation flux 49 forms an outer loop. The bias flux 45 forms an upper inner loop and the bias flux 47 forms a lower inner loop. The air gaps across which the force is developed are R1 and R3 (upper pair) and R2 and R4 (lower pair). With the reaction mass centered within its range of travel, which is its average position, the size of all the variable gaps is the same. The bias fluxes 45 and 47 are therefore the same. The flux in the upper pair of gaps R1 and R3 is the difference between excitation and the bias flux. The flux in the lower pair of gaps R2 and R4 is similarly the sum of the excitation and bias flux.

The basic expression for the force produced in an air gap is:

$$F = \frac{(\Phi + \Phi bias)^2}{2 \times \mu \times Agap}$$

where:

F=force produced gap (N) μ=permeability of free space (T/A–m)

Agap=face area of each magnetic gap (m²)

exc=excitation flux (Wb) Φbias=bias flux (Wb)

The net force produced by this force generator is the difference between the force at the upper pair of gaps minus the force at the lower pair of gaps.

$$Fnet = \frac{(\Phi exc + \Phi bias)^2 - (\Phi exc - \Phi bias)^2}{2 \times \mu \times Agap \times 2} = \frac{(\Phi exc \times \Phi bias)}{\mu \times Agap}$$

The net force is thus linearly related to the excitation flux.

Figure 3:
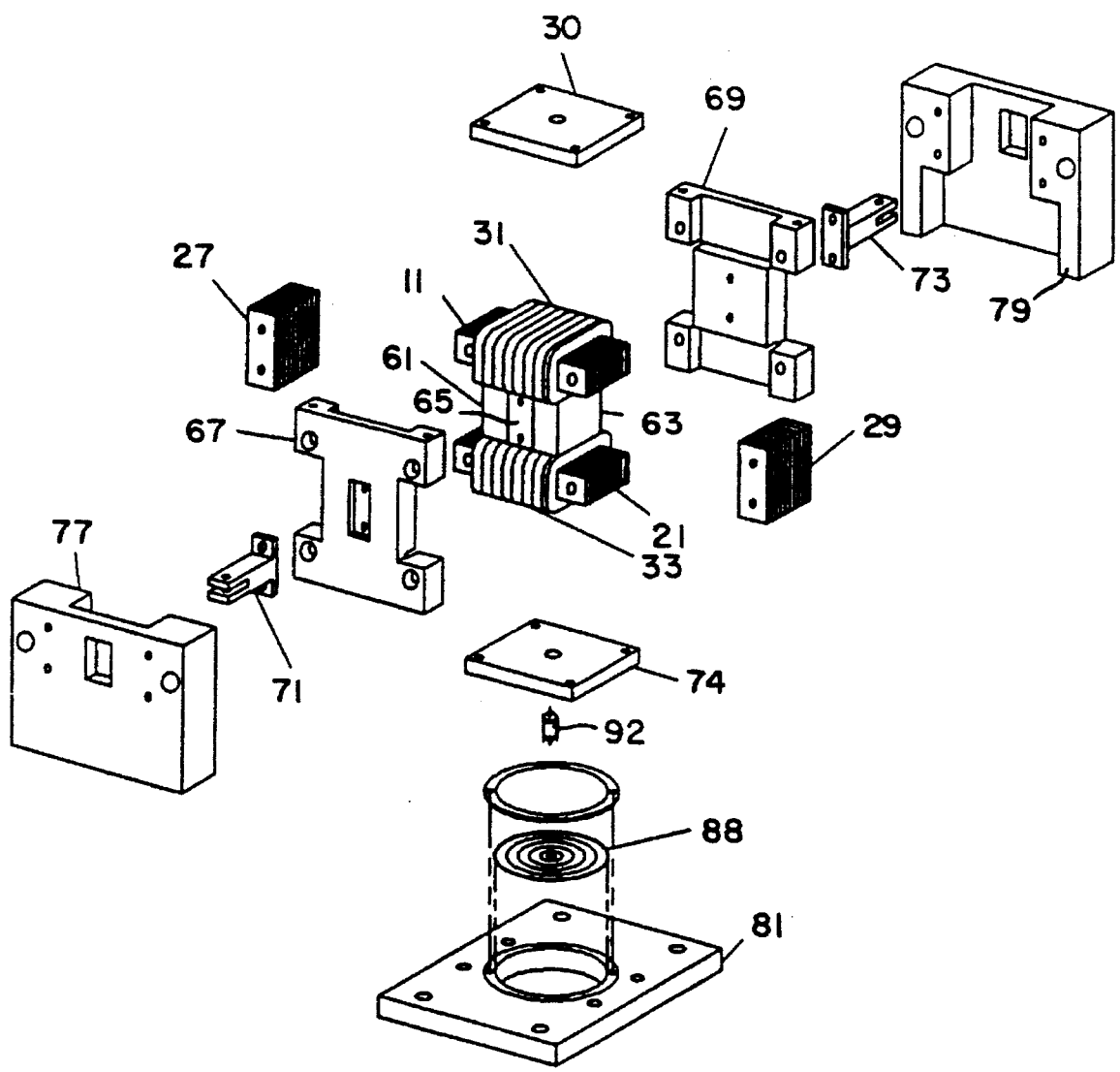
FIG. 3 is an exploded view showing the components of a physical embodiment of a force generator in accordance with the present invention.
Figure 4:
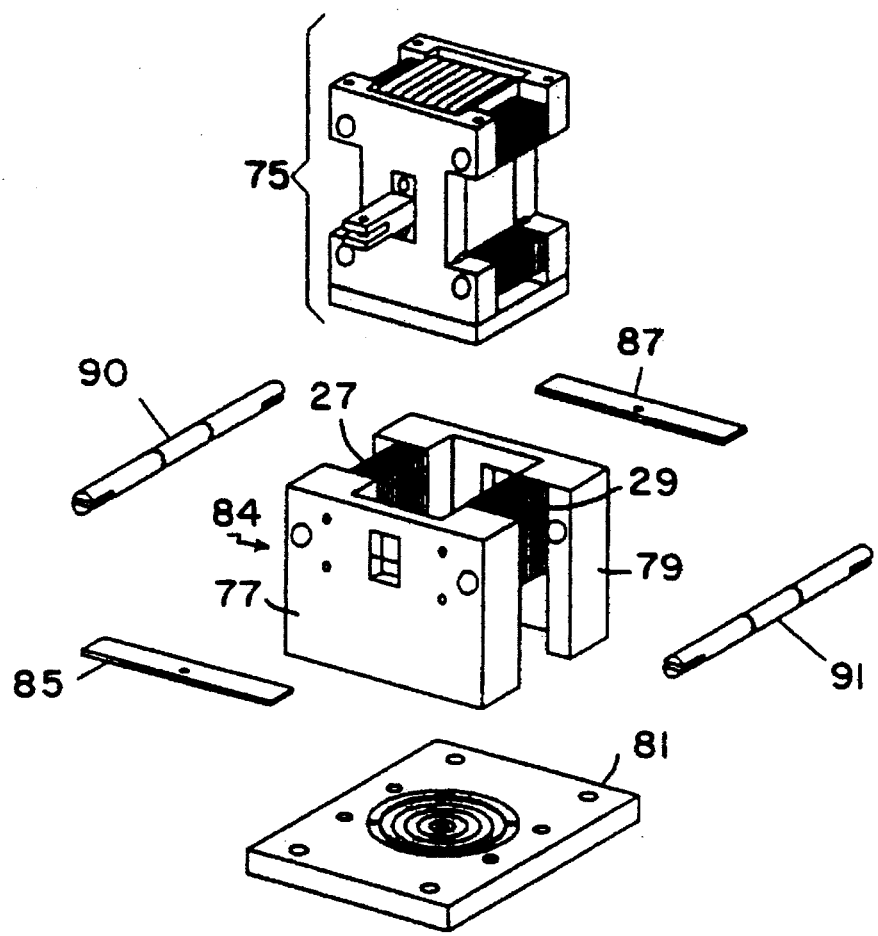
FIG. 4 is a drawing showing components from FIG. 3 put together as subassemblies.
Figure 5:
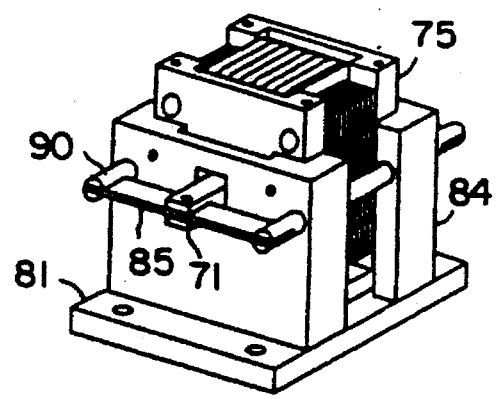
FIG. 5 is a drawing showing a complete assembly of the components of FIG. 3.

In FIGS. 3–5, the elongate cores and their windings are identified by the same reference characters as in FIG. 1. Between the two elongate cores is a magnetic structure made up of two blocks of rare earth magnetic material, identified by reference characters 61 and 63, separated by a magnetically permeable iron block 65 which is used for mechanical attachment. These three elements are cemented together by an epoxy resin and essentially function in the same manner as the single magnet of FIG. 1.

The elongate cores with their windings, together with the permanent magnet structure are secured together by side frames 67 and 69 which are provided with respective mounting arms 71 and 73. The side frame pieces, 67 and 69 are bridged by a bottom plate 74. The various fasteners which secure these elements together are not shown in the interest of clarity of illustration. The configuration of the complete subassembly is indicated by reference character 75 in FIG. 4. As will be understood, this subassembly constitutes and comprises an inertial mass which is reacted against to generate the force being applied to the structure under test.

The relatively moveable cores are identified by the same reference characters, 27 and 29, as in FIG. 1. These relatively moveable cores are mounted between light weight, e.g. aluminum, end plates 77 and 79 which are in turn mounted on a light weight base plate or mounting flange 81. This output assembly or frame is identified by reference character 84 in FIGS. 4 and 5.

The resilient suspension for supporting inertial mass 75 within the output frame 84 comprises a pair of flat springs 85 and 87, and a diaphragm type spring 88 mounted within an opening in the base plate 81. Mounting arms 71 and 73 are attached to the mid points of the springs and the ends of the springs pass through slots in the ends of pivot rods 90 and 91 which are journaled in the end plates 77 and 79. A stud 92, extending from the bottom plate 74 to the mid-point of the diaphragm spring 88 maintains the orientation of the inertial mass with respect to the mounting frame. As will be apparent, in order to achieve the completed assembly as illustrated in FIG. 5, the components must be assembled in the final intermeshed configuration of FIG. 5, rather than being put together as the subassemblies illustrated in FIG. 4.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. An electromagnetic force generator comprising:

a first elongate magnetic core having transversely facing pole faces at each end;

a second elongate magnetic core essentially paralleling said first core and spaced therefrom in fixed relation and having transversely facing pole faces at each end aligned with corresponding pole faces of said first core;

between each pair of aligned pole faces, a relatively moveable magnetic core, each of said moveable cores being moveable in the direction extending between the respective aligned pole faces;

a magnet mounted in fixed relation between said first and second cores and being polarized along an axis essentially paralleling the length of said first and second cores and extending at each end to a point adjacent to said relatively moveable cores thereby to establish respective sliding gaps;

means for attaching said moveable cores to a structure to which force is to be applied;

suspension means providing a compliant mechanical connection between said relatively moveable cores and said first and second cores; and respective windings around said first and second cores whereby a.c. energization of said windings will generate a corresponding vibratory force between said moveable cores and said first and second cores.

2. A force generator as set forth in claim 1 wherein said first and second cores are constructed of laminations of a material exhibiting a relatively low reluctance.

3. A force generator as set forth in claim 2 wherein said laminations are iron.

4. A force generator as set forth in claim 1 wherein said magnet is a permanent magnet comprising a material exhibiting a relatively high reluctance.

5. A force generator as set forth in claim 4 wherein said permanent magnet material is a rare earth magnet.

6. An electromagnetic force generator comprising:

a first elongate magnetic core providing transversely facing pole faces at each end;

a second elongate magnetic core essentially paralleling said first core and spaced therefrom in fixed relation and providing transversely facing pole faces at each end aligned with corresponding pole faces of said first core;

between each pair of aligned pole faces, a relatively moveable magnetic core, each of said moveable cores being moveable in the direction extending between the respective aligned pole faces;

suspension means providing a compliant mechanical connection between said relatively moveable cores and said first and second cores permitting movement of said moveable cores toward and away from said pole faces;

a permanent magnet mounted fixedly between said first and second cores and being polarized along an axis essentially paralleling said first and second cores and extending at each end to a point adjacent to said relatively moveable cores thereby to establish respective sliding gaps and thereby to polarize said moveable cores, the widths of the sliding gaps remaining substantially constant as the cores move;

means for attaching said moveable cores to a structure to which force is to be applied; and respective windings around said first and second cores whereby a.c. energization of said windings will generate a corresponding vibratory force between said moveable cores and said first and second cores.

7. A force generator as set forth in claim 6 wherein said first and second cores are constructed of a material exhibiting a relatively low reluctance and said permanent magnet comprises a material exhibiting a relatively high reluctance where relatively little of the a.c. flux induced energization of said windings traverses said permanent magnet.

8. A force generator as set forth in claim 6 wherein said suspension means comprises springs tending to nominally center said moveable cores between the respective pole faces of the elongate cores.

9. An electromagnetic force generator comprising:

a first elongate laminated magnetic core exhibiting low reluctance and providing transversely facing pole faces at each end;

a second elongate laminated magnetic core exhibiting low reluctance and essentially paralleling said first core and spaced therefrom in fixed relation and providing transversely facing pole faces at each end aligned with corresponding pole faces of said first core;

between each pair of aligned pole faces, a magnetic core relatively moveable between the respective aligned pole faces, each of said moveable cores being moveable in the direction extending between the respective aligned pole faces thereby to provide variable gaps;

suspension means providing a compliant mechanical connection between said relatively moveable cores and said first and second cores permitting resilient movement of said moveable cores toward and away from said pole faces with the moveable cores being nominally centered between the aligned pole faces;

a high reluctance permanent magnet mounted fixedly between said first and second cores and being polarized along an axis essentially paralleling said first and second cores and extending at each end to a point adjacent to said relatively moveable cores thereby to establish respective sliding gaps and thereby to polarize said moveable cores, the widths of the sliding gaps remaining substantially constant as the cores move;

frame means for attaching said moveable cores to a structure to which force is to be applied; and respective windings around said first and second cores whereby a.c. energization of said windings will generate a corresponding vibratory force between said moveable cores and said first and second cores.

* * * * *

UNITED STATES PATENT AND TRADEMARK OFFICE
CERTIFICATE OF CORRECTION

PATENT NO. : 5,587,615
DATED : December 24, 1996
INVENTOR(S) : Bruce S. Murray, et. al.

It is certified that error appears in the above-indentified patent and that said Letters Patent is hereby corrected as shown below:

Column 4, at the beginning of line 1, before "exc=excitation" (part of formula), insert "Φ".

Signed and Sealed this

Twenty-ninth Day of July, 1997

Attest:

BRUCE LEHMAN

*Attesting Officer*   *Commissioner of Patents and Trademarks*